United States Patent [19]
Kettelhoit et al.

[11] Patent Number: 4,790,901
[45] Date of Patent: Dec. 13, 1988

[54] LAMINATING DEVICE FOR MANUFACTURING IDENTIFICATION CARDS

[75] Inventors: Johannes Kettelhoit, Verl; Hans W. Künne, Rheda-Wiedenbrück; Erhard Schröder, Gütersloh, all of Fed. Rep. of Germany

[73] Assignee: D.I.S. Versand Service GmbH, Versmold, Fed. Rep. of Germany

[21] Appl. No.: 151,708

[22] Filed: Feb. 3, 1988

Related U.S. Application Data

[63] Continuation of Ser. No. 713,271, Mar. 18, 1985, abandoned.

[30] Foreign Application Priority Data

Mar. 16, 1984 [DE] Fed. Rep. of Germany ....... 3409808

[51] Int. Cl.⁴ .............................................. B30B 15/34
[52] U.S. Cl. .................... 156/498; 100/93 P; 156/583.1; 156/583.7; 219/243; 219/468; 219/552
[58] Field of Search ..................... 156/498, 515, 583.1, 156/583.2, 583.3, 583.7, 583.9; 100/93 P; 219/243, 468, 552, 553

[56] References Cited

U.S. PATENT DOCUMENTS

| | | | |
|---|---|---|---|
| Re. 31,729 | 11/1984 | Giulie et al. | 156/583.1 |
| 2,574,095 | 11/1951 | Langer | 156/583.2 |
| 2,714,416 | 8/1955 | Fener | 156/583.2 |
| 3,569,665 | 3/1971 | Hager, Jr. | 219/243 |
| 3,703,427 | 11/1972 | Sellers et al. | 219/243 |
| 3,859,159 | 1/1975 | Carter et al. | 156/583.2 |
| 4,108,713 | 8/1978 | Weisz | 156/583.3 |
| 4,292,118 | 9/1981 | Wyslotsky | 156/498 |

Primary Examiner—Michael Wityshyn
Attorney, Agent, or Firm—Michael J. Striker

[57] ABSTRACT

A laminating device for producing identification cards includes a press for glueing a number of foil sheets together; the press includes a lower press and an upper press. Each press is provided with a heating element, which is formed as a heating resistance element, and an insulation layer which is placed between the heating element and a metallic block which forms a portion of each press, to which a pressing force is applied. Each metallic block is cooled in cooperation with the insulation layer so that its temperature during the glueing and cooling process remains constant.

13 Claims, 2 Drawing Sheets

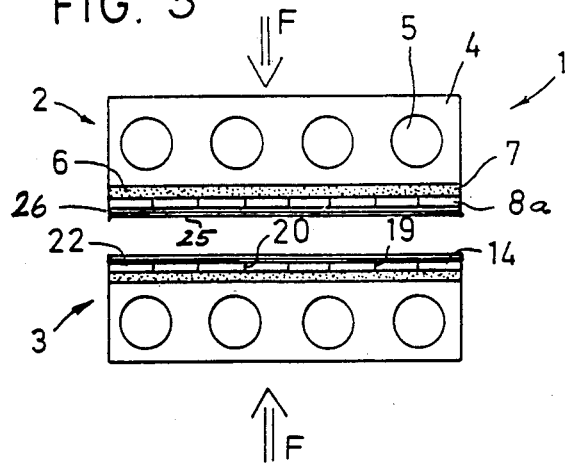
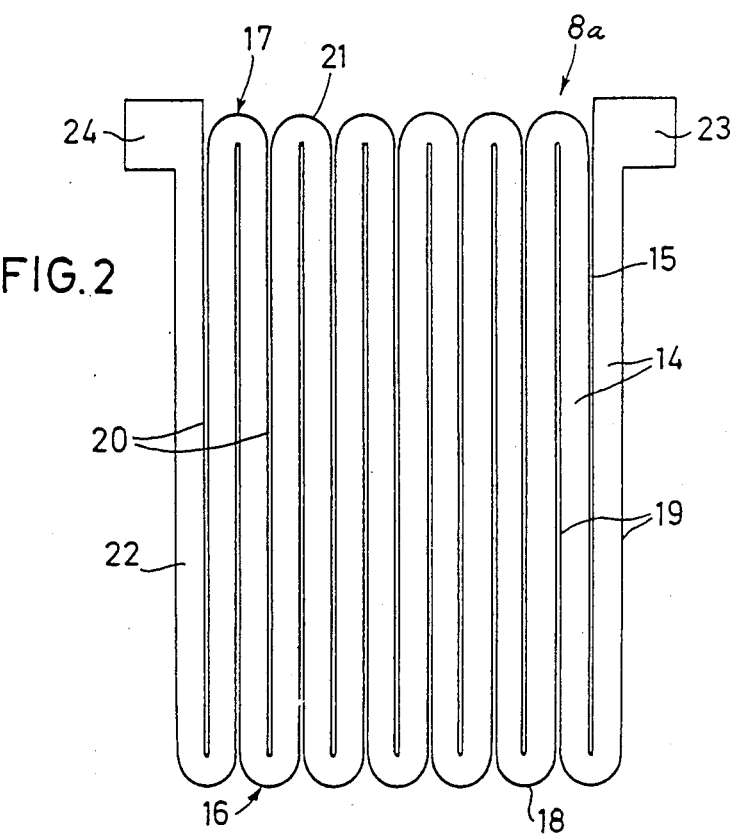

LAMINATING DEVICE FOR MANUFACTURING IDENTIFICATION CARDS

This is a continuation of application Ser. No. 713,271, filed Mar. 18, 1985, now abandoned.

BACKGROUND OF THE INVENTION

The present invention relates to a laminating device particularly for laminating plates, for example identification cards comprised of at least one inner data and/or information-carrying foil of plastics and at least two transparent protective outer foils for the front and the rear sides of the card.

The lamination devices of the foregoing type normally include a press including a heat transferring device and a pressure stamp.

Conventional laminating devices comprise at least one metallic block positioned in a press and provided with cooling fins and a heating element disposed below the metallic block and formed substantially of two fiber glass mates, between which resistance heating paths are provided. Heat generated in the heating element is transmitted to the metallic block which is heated up thereby. Cooling of the metallic block takes place during the laminating or welding process so that the metallic block is not heated up to a welding temperature.

After the lamination or welding has taken place the metallic block is to be again recooled.

For the acceleration of the laminating process it is provided in the conventional device that the cooling is not entirely completed while the pressed product is in the press. The press is opened and cards are removed from the press and transported to a cooling station. This procedure, however, is time-consuming and requires a great deal of electrical energy so that the manufacture of identification cards is rather expensive.

SUMMARY OF THE INVENTION

It is an object of the present invention to provide an improved laminating device for producing identification cards.

It is another object of this invention to provide a laminating device in wiich heating-up and cooling of the press and thereby welding together or glueing of card foils would be very quickly executed, for example for a few seconds so that a complete cooling would be performed when the foils to be laminated are still under pressure.

These and other objects of the present invention are attained by a laminating device for producing identification cards carrying data and/or information out of blanks including at least one core foil of plastics, at least one transparent protective foil of plastics for a front side of a card and at least one transparent protective foil of plastics for a back side of a card, the device comprising a press including at least one metallic press member for welding said foils together and having cooling means and a pressing side facing a card to be laminated; a heating element on said pressing side and having a pressing surface; and a thin electrically insulated insulation layer positioned between said metallic press member and said heating element and partially transmitting heat generated by said heating element to said press member and providing homogenous pressure distribution during welding of said foils together, said heating element having small heating capacity and a small thickness and being formed as a metallic resistance heating element through which electric current flows directly, said press member being cooled in cooperation with said insulation layer so that a temperature of said press member remains constant during the welding and the cooling.

The resistance heating element may include a plurality of current conductive strips connected to each other in series and positioned one next to the other in one plane and having a relatively great width as compared to a thickness thereof.

The width of each conductive strip may be in the range from 5 to 50 mm. The thickness of the resistance heating element is in the range of 0.05 to 0.5 mm.

The insulation layer may be made of polyurethane foamed material impregnated at two sides with glue.

The thickness of the insulation layer may be in the range from 0.2 to 2 mm.

The resistance heating element may be made of non-sintered steel sheet.

The heating element may be formed by a deposited electrically conductive path.

The heating element may include relatively wide current conductive strips formed in said steel sheet by errosion.

The strips may be spaced from each other by separating gaps, said gaps being filled with heat-resistant, pressure-stable, heat-conducting glue.

The strips may be spaced from each other by thin straight-line separating gaps and be positioned to form a first structure with parallel straight-line elements connected to each other by curved portions and a second structure with parallel straight-line elements connected to each other by curved portions so as to form a large-surface, serpentine-shaped current-conductive path with closely adjacent straight-line elements.

The heating element may further include electric connection webs positioned at ends of said path.

The separating gaps may be filled with electrically insulating material so that an upper surface of said path is flush with an upper surface of said insulating material.

An electrically insulating material may be heat-resistant, pressure-stable, heat-conductive glue.

The device may further include a pressure plate of small heat capacity but good heat conductivity, said pressure plate being mounted to a side of said heating element facing a card to be laminated.

An electrically insulating layer may be positioned between said pressure plate and said heating element.

Said electrically-insulating layer may be made of a fiber glass mate impregnated with heat-resistant, pressure-stable, heat-conductive glue.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 2 is a top plan view of a heating resistance element; and

FIG. 3 is a schematic view of a press of a laminating device for individual card blanks.

DETAILED DESCRIPTION OF THE PREFERRED EMBODIMENTS

Figure 1:
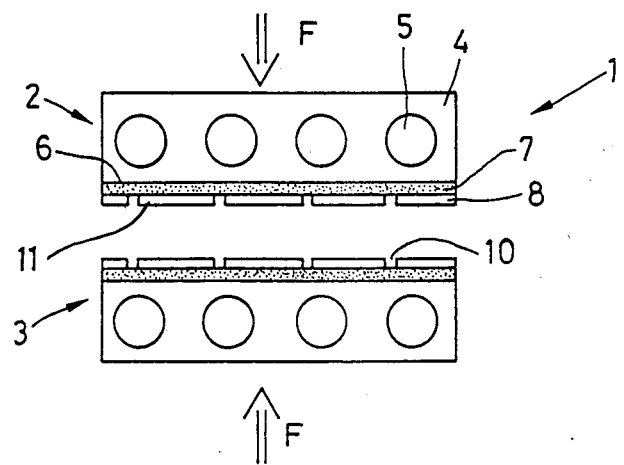
FIG. 1 is a schematic side view of a press of a laminating device for sheets having a plurality of identification card blanks.

A laminating device normally includes a casing in which force-generating means and electrical connections are located. These and other conventional structural components of the laminating device are not shown in the drawings for the sake of clarity. FIG. 1 illustrates a press tool 1, without showing however, any connecting means for connecting pressure-applying means to the pressure tool since these connecting means as well as pressure-applying means are well known in the art. Arrows F indicate the directions of the application of pressure forces acting on the press tool 1.

The press tool 1 includes an upper pressure stamp 2 and a lower pressure stamp 3 which are identical and superposed one on the other. A pooduct to be welded or heat-sealed together, namely a card to be produced (not shown), is normally placed between two opposing surfaces of the pressure stamps 2 and 3.

Dimensions of the pressure stamps correspond to the dimensions of the sheet with a plurality of identification card blanks which may be positioned one next to the other and/or one under the other. According to the invention each pressure stamp is a metallic member 4, preferably of rectangular or square cross-section, which is provided with cooling passages 5 extending therethrough or with cooling fins or the like cooling elements. A cooling medium can be sprayed through the cooling passages 5.

Each metallic member 4 carries on its pressure surface 6 over the entire area thereof a thin, even insulation layer 7. These insulation layers of both pressure stamps must be electrically insulated and particularly insulated against heat transfer in a predetermined contour so that only a certain amount of heat would be allowed to pass through the each insulation layer. Furthermore, each insulation layer 7 must be formed so that it would ensure a homogenous pressure distribution over the entire surface of each identification card blank. The insulation layer 7 is preferably comprssed of polyurethane foam material having self-gluing faces at two sides thereof.

Each insulation layer 7 carries at the side thereof, facing away from the metallic member or block 4, a heating element 8 which has a very small thickness and very small heat capacity. This heating element is made out of metal, and electric current is applied to flow therethrough. Each heating element 8 can be formed preferably of non-sintered steel with current connection webs so as to constitute a very thin heating resistance path.

The heating element 8 can be formed of a plurality of thin steel strips 11 positioned one after another as can be seen from FIG. 1. The width of each strip 11 corresponds to the width or length of a single identification card blank. Strips 11 are spaced from each other by such intervals that gaps 10 result therebetween; the widths of gaps 10 are to be maintained very small and correspond to the gaps between the neighboring identification card blands. The strips 11 in each heating element are connected in series so that the same electric current flows through each strip. The steel strips 11 have suitable electric resistance values and suitable surface qualities. The upper surface of each strip 11 is even and smooth.

In accordance with a modified embodiment of the invention, the gaps or interstices 10 can be filled with an electrically insulating material, for example known heat-resistant, pressure-stable, heat-conductive glue so that the even upper surface of the current path of strips 11 would be flush with the upper face of the glue filling the separating gaps 10. This glue is not shown in the drawings.

According to the invention a cooling medium, for example water is passed through passage 5 by any suitable conventional means. This results in the fact that a portion of heat generated in the heating element 8 during the welding operation flows through the insulation layer 7 away to the metallic block 4; on the other hand the insulation layer ensures that a predetermined amount of heat is not translated to the respective block 4 but is transferred to the sheet positioned between two metallic blocks 4. Each insulation layer 7 serves for electric insulation between the heating element 8 and the respective metallic block 4. An amount of heat occurring in the metallic block 4 is carried away by the cooling medium flowing through passages 5 whereby the temperature of each metallic block 4 remains constant. Another portion of heat is utilized immediately for heat-sealing or welding together of foils positioned between the pressure stamps of the press.

The heating element positioned in the immediate vicinity of the sheet to be heat-sealed is very thin and therefore has very small heat capacity so that temperature effect takes place directly on the foils being welded together. The material, of which current conducting strips 11 are formed, is so selected that a very rapid heating-up of strips 11 can be obtained. Cooling, after the application of electric current to strips 11 has been ceased, is also obtained very quickly because the heating element has an extremely small heating capacity with, however good heat-conducting property, and heat would be very rapidly transferred through the thin insulation layer 7 to the metallic block 4. Particularly advantageous in the arrangement according to the present invention is the fact that a temperature regulation or adjustment can be precisely obtained by electric resistance of the current conducting strips 11, and a predetermined temperature would be effectively attained immediately in the identification card blank.

In the embodiment of FIG. 3 the dimensions of the pressure stamps of the press correspond to the dimensions of a single identification card blank. The press also includes two superposed pressure stamps 2 and 3, each formed as a metallic member or block 4 of a rectangular or square cross-section. Passages 5 for passing cooling medium therethrough are formed in each metallic block 4. Cooling fins or like elements, rinsed with a cooling medium, can be also provided on each metallic block. A thin insulation layer 7 is applied to the entire pressure surface 6 of each metallic block A heating element 8a is provided at the face of each insulation layer 7, facing away from the metallic block. Each heating element 8a is made of steel and provided with current connection webs or passages and forms a thin resistance heating path.

In the press for an individual identification card blank (FIG. 3) the heating element 8a is made of a very thin steel sheet in which the resistance heating path if formed by erosion so as to produce current-conductive strips 14 which are relatively wide as compared to the thickness of the sheet, and are separated by thinner straight-line separating gaps or interstices 15. The separating gaps 15 are formed so that two structures 16 and 17 of the heating element result whereby the structure 16 is formed of parallel straight-line elements 19 connected to each other at curves 18, while the structure 17 is also formed of parallel straight-like elements 20 connected to each other curves at or elbows 21 so that each straight-like element 19 is positioned between two straight-line elements 20. A large-surface, serpentine current conductive path 22 with the close individual current paths limited in narrow space would result in the heating element 8a. The current conductive path 22 forms a resistance heating element in which current connection webs or pieces 23 and 24 are provided at each side of path 22. It is essential that the shape of the current conductive path is so selected that it can be heated homogenously. The serpentine shape of the current conductive path is optimal particularly because very small optimal intervals are provided between individual current conductive paths 14. In this embodiment an even, smooth pressing sheet or plate 25 which has small heating capacity and good heat conductivity is provided on each heating element 8a at the side thereof facing a card blank. The pressing sheet or plate 25 is electrically insulated from the respective heating element 8a and is spaced therefrom by means of a fiber glass mat or sheet 26 impregnated with heat-conductive glue. A specifically even and smooth pressing surface is obtained thereby in the arrangement of this invention.

After an identification card has been heat-sealed or welded together in the press of this invention the card element is stamped out to a finished shape while the card element is still held by the pressure stamps 2 and 3. According to another modification the stamped-out card element can be formed such that at least portions of the protruding edges would remain on the stamped-out card element so that these portions would be used to remove this card from the press and place it into another stamp. Such an embodiment is not shown in the drawings. It can be inserted into the device for producing identification cards and formed as a conventional stamp. It is important, however, that the stamp would be positioned inside the device for laminating cards so that the stamping operation would not take place during the pressing operation.

According to a further modification the heating element can be formed as an electroplated or deposited conductive path. This modified arrangement is specifically advantageous when the heating element should include a plurality of current conductive paths positioned one next to the other in a narrow space, electrically connected to each other in series and having a width which is great as compared to the thickness of the heating element. Such electrically conductive paths would have the width, preferably from 5 to 50 mm.

It will be understood that each of the elements described above, or two or more together, may also find a useful application in other types of devices for laminating identification cards differing from the types described above.

While the invention has been illustrated and described as embodied in a device for laminating identification cards, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A laminating device for producing identification cards carrying data and/or information out of blanks including at least one core foil of plastics, at least one transparent protective foil of plastics for a front side of a card and at least one transparent protective foil of plastics for a back side of a card, the device comprising a press including at least one metallic press member for welding said foils together and having cooling means and a pressing side facing a card to be laminated; a heating element on said pressing side; and a thin electrically insulated insulation layer positioned between said metallic press member and said heating element and partially transmitting heat generated by said heating element to said press member and providing homogenous pressure distribution during welding of said foils together, said heating element having small heating capacity and a small thickness and being formed as a metallic resistance heating element through which electric current applied thereto flows directly, said press member being cooled in cooperation with said insulation layer so that a temperature of said press member remains constant during the welding and the cooling, said metallic resistance heating element including a plurality of current conductive strips connected to each other in series and positioned in one plane and with a close spacing so as to provide a substantially continuous press face which forms an outer press face which directly contacts an identification card being produced.

2. The device as defined in claim 1, wherein the width of each conductive strip is in the range from 5 to 50 mm.

3. The device as defined in claim 1, wherein a thickness of said resistance heating element is in the range from 0.05 to 0.5 mm.

4. The device as defined in claim 1, wherein said insulation layer is made of polyurethane foamed material impregnated at two sides with glue.

5. The device as defined in claim 1, wherein a thickness of said insulation layer is in the range from 0.2 to 2 mm.

6. The defice as defined in claim 1, wherein said resistance heating element is made of non-sintered steel sheet.

7. The device as defined in claim 6, wherein said current conductive strips are formed in said steel sheet by errosion.

8. The device as defined in cliam 1, wherein said heating element is formed by a deposited electrically-conductive path.

9. The device as defined in claim 1, wherein said strips are spaced from each other by separating gaps, said gaps being filled with heat-resistant, pressure-stable, heat-conducting glue.

10. The device as defined in claim 1, wherein thin straight-line separating gaps separate said conductive strips from each other, said strips being connected to each other by curved portions so as to form a large-surface, serpentine-shaped current-conductive path.

11. The device as defined in claim 10, wherein said heating element further includes electric connection webs positioned at ends of said path.

12. The device as defined in claim 11, wherein said separating gaps are filled with electrically insulating material.

13. The device as defined in claim 12, wherein said electrically insulating material is heat-resistant, pressure-stable, heat-conductive glue.

* * * * *